No. 739,154. PATENTED SEPT. 15, 1903.
J. CRAWFORD.
COMBINED TRAP AND THIMBLE.
APPLICATION FILED APR. 6, 1903.
NO MODEL.

Witnesses.
Lauritz N. Möller
Anna B. Hammerich

Inventor
James Crawford.
by Alban Andrews his atty.

No. 739,154. Patented September 15, 1903.

UNITED STATES PATENT OFFICE.

JAMES CRAWFORD, OF BOSTON, MASSACHUSETTS.

COMBINED TRAP AND THIMBLE.

SPECIFICATION forming part of Letters Patent No. 739,154, dated September 15, 1903.

Application filed April 6, 1903. Serial No. 151,221. (No model.)

*To all whom it may concern:*

Be it known that I, JAMES CRAWFORD, a citizen of the United States, and a resident of Boston, in the county of Suffolk and State of Massachusetts, have invented certain new and useful Improvements in a Combined Trap and Thimble, of which the following is a specification.

The invention relates to improvements in adjustable trap and thimble particularly well adapted for sinks, but may to advantage be used as a floor-drainer in bath or toilet rooms, hospital operating or dissecting rooms, &c., and it is carried out as follows, reference being had to the accompanying drawings, wherein—

Figure 2:
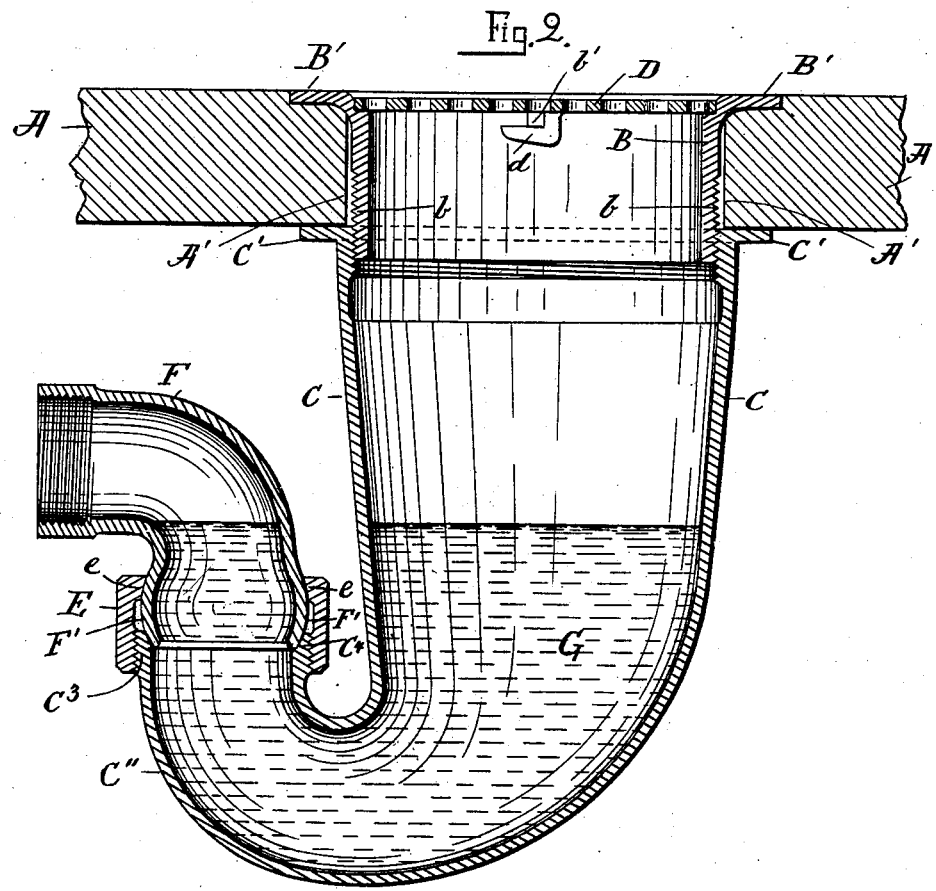
Figure 1:
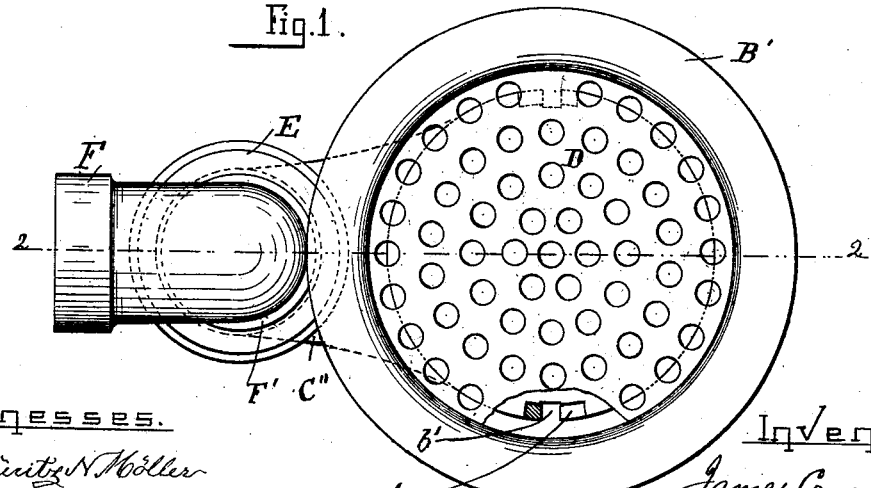

Figure 1 is a top plan view of the invention, and Fig. 2 is a central longitudinal section on the line 2 2 shown in Fig. 1.

Similar letters refer to similar parts wherever they occur on the different parts of the drawings.

In Fig. 2, A represents the bottom of a sink or the floor of a room in connection with which the device is to be used. In said sink or floor is made a perforation A', through which is inserted an open-ended thimble B', having at its upper end a flange B, preferably let in or recessed in the upper portion of the sink or floor A, as shown in Fig. 2. In practice I make the lower exterior portion of the thimble B' screw-threaded, as shown at $b$ in Fig. 2, onto which is connected the upper internally-screw-threaded end of the trap C, as shown. In practice I make on the upper end of the trap C a flange C', which serves as a rest against the under side of the sink or floor A when said trap is secured in position relative to the thimble B', as represented in Fig. 2.

In the upper end of the thimble B' is made an annular recess, in which is located a perforated detachable strainer D, provided on its under side with hooks $d$ $d$, adapted to interlock with projections $b'$ $b'$ on the interior of the thimble B', as shown in Figs. 1 and 2. The strainer D may readily be detached from the thimble B' by turning it around its axis sufficiently to disengage the hooks $d$ $d$ from the projections $b'$ $b'$, when the said strainer may be raised and removed from the said thimble, so as to get free access to the interior of the trap C for the purpose of readily removing therefrom by hand direct any solid or similar matter that may have accumulated therein. The said trap C is made slightly tapering downward and provided at its lower end with a semicircular and upwardly-projecting neck C'', having an external screw-thread $C^3$, onto which is screwed an adjustable annular nut E, by means of which the elbow-pipe F is adjustably secured to said neck C'', as shown in the drawings.

The connection between the elbow-pipe F and the neck C'' is of the kind usually termed "ball-and-socket" joint to enable the elbow F to be readily adjusted and connected to the discharge-pipe according to the level and inclination of the latter, and for such purpose I make on the elbow-pipe F, where it joins the neck C'', a ball or spherical portion F', the lower end of which is seated and fits into a curved socket $C^4$ in the upper end of the neck C, as shown in Fig. 2. The nut E is provided with an internal annular flange $e$, adapted to engage the exterior portion of the ball F', so as to cause the lower end of the latter to be held water-tight against the seat $C^4$ when the nut E is tightened after the elbow F has been properly adjusted relative to the inclination of the discharge-pipe.

G in Fig. 2 represents the liquid in the lower portion of the trap, by which the latter and its connection to the elbow-pipe is sealed so as to prevent escapement of sewer-gas.

By having the trap directly connected to the under side of the sink or floor, as shown, it can readily be cleansed and accumulations removed by hand alone by unskilled labor whenever so desired.

What I wish to secure by Letters Patent and claim is—

1. The herein-described trap and thimble comprising in combination a screw-threaded thimble provided at its upper end with a laterally-projecting supporting-flange and with an interiorly-arranged detachable strainer, a downwardly-tapered trap interiorly threaded at its upper end and provided with a laterally-projecting flange, the said trap being screwed to the thimble, and said flanges engaging the opposite sides of the floor or sink, the lower end of the trap being upturned, a curved and universally-adjustable discharge-pipe, and the union-coupling for adjustably connecting said reduced end of the trap and the discharge-pipe, substantially as described.

2. The herein-described trap and thimble comprising in combination a downwardly-tapered trap having its lower end upturned, a thimble connected to the upper end of said trap and provided with a strainer, a universally-adjustable discharge-pipe seated in the upturned end of said trap, and a union-coupling for adjustably connecting the upturned end of the trap to said discharge-pipe.

3. In combination, a trap, a thimble connected to the upper end thereof, said thimble provided with an annular recess, a removable strainer mounted in said recess, and a discharge-pipe connected by a universal joint to the lower end of said trap.

In testimony whereof I have affixed my signature in presence of two witnesses.

JAMES CRAWFORD.

Witnesses:
ALBAN ANDRÉN,
THAREM C. PETTINGELL.